United States Patent
Song et al.

(10) Patent No.: US 8,982,988 B2
(45) Date of Patent: Mar. 17, 2015

(54) APPARATUS AND METHOD FOR TRANSMITTING AND RECEIVING SIGNAL OF OFDM SYSTEM

(71) Applicant: Electronics and Telecommunications Research Institute, Daejeon (KR)

(72) Inventors: Jin Hyuk Song, Seoul (KR); Jong Soo Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 47 days.

(21) Appl. No.: 13/866,174

(22) Filed: Apr. 19, 2013

(65) Prior Publication Data
US 2014/0153667 A1    Jun. 5, 2014

(30) Foreign Application Priority Data
Dec. 5, 2012    (KR) .................. 10-2012-0140440

(51) Int. Cl.
H04L 27/00    (2006.01)
H04L 27/26    (2006.01)

(52) U.S. Cl.
CPC .................. H04L 27/2602 (2013.01)
USPC ........................................ 375/295

(58) Field of Classification Search
CPC .............. H04L 27/2614; H04L 27/2003
USPC ........................................ 375/295
See application file for complete search history.

(56) References Cited

U.S. PATENT DOCUMENTS

| 4,901,344 | A | * | 2/1990 | Monette et al. | ............ | 379/93.06 |
| 8,073,079 | B1 | * | 12/2011 | Ahmed | ......................... | 375/324 |
| 2002/0190886 | A1 | * | 12/2002 | Ignjatovic et al. | ............ | 341/155 |
| 2006/0274641 | A1 | * | 12/2006 | Grieco et al. | ................. | 370/210 |
| 2007/0027678 | A1 | * | 2/2007 | Hotho et al. | ................... | 704/203 |

OTHER PUBLICATIONS

Wang, "Reduction of peak-to-average power ratio of OFDM system using a companding technique," IEEE Trans. Broadcast., vol. 45, No. 3, pp. 303-307, Sep. 1999.*
Jiang, "Nonlinear Companding Transform for Reducing Peak-to-Average Power Ratio of OFDM Signals," IEEE Transactions on Broadcasting, vol. 50, No. 3, Sep. 2004.*
Kim, "An Effective Clipped Companding Scheme for PAPR Reduction of OFDM Signals," IEEE ICC 2008.*
Xiao, "Reduction of peak-to-average power ratio of OFDM signals with Companding transform," IEEE Electronics Letters 12th, vol. 37, No. 8, pp. 506-507, Apr. 2001.*
Huang, "Companding Transform for Reduction in Peak-to-Average Power Ratio of OFDM Signals," IEEE transactions on wireless communications, vol. 03, No. 6, Nov. 2004.*

(Continued)

Primary Examiner — Juan A Torres
(74) Attorney, Agent, or Firm — Ladas & Parry LLP

(57) ABSTRACT

A method and apparatus for transmitting an orthogonal frequency division multiplexing (OFDM) signal including converting a distribution of a signal in which inverse Fourier transform is performed in an OFDM system and a method of receiving an OFDM signal including expanding a received signal are provided, and by changing a magnitude distribution of a signal that is output from an OFDM modulator to a bimodal Gaussian distribution, an influence of noise in a receiving terminal can be reduced, and by limiting a signal that is output from an OFDM modulator to an appropriate magnitude, a phase in the receiving terminal can be prevented being wrongly demodulated.

7 Claims, 9 Drawing Sheets

(56) References Cited

OTHER PUBLICATIONS

Sakran, "WiMAX Performance with Compander for PAPR Reduction in the Presence of Non-Linear Power Amplifier over SUI MultiPath Channels", 26th national radio science conference (NRSC2009), Mar. 17-19, 2009.*

Thompson, "Constant Envelope OFDM" IEEE transactions on communications, vol. 56, No. 8, Aug. 2008.*

* cited by examiner

APPARATUS AND METHOD FOR TRANSMITTING AND RECEIVING SIGNAL OF OFDM SYSTEM

CROSS-REFERENCE TO RELATED APPLICATION

This application claims priority to and the benefit of Korean Patent Application No. 10-2012-0140440 filed in the Korean Intellectual Property Office on Dec. 5, 2012, the entire contents of which are incorporated herein by reference.

BACKGROUND OF THE INVENTION (a) Field of the Invention

The present invention relates to a method and apparatus for transmitting and receiving an OFDM signal in an orthogonal frequency division multiplexing (OFDM) system.

(b) Description of the Related Art

OFDM is 4G modulation technology that is expected to be selected as a digital TV standard of Europe, Japan, and Australia. OFDM technology is a kind of a multicarrier modulation method, and distributes and transmits data to a plurality of carriers that are separated by a predetermined gap. An OFDM system exhibits excellent performance in a multi-path and mobile reception environment through such a modulation transmission method.

However, when a signal that is formed with a plurality of subcarriers is added with the same phase in a time domain, in OFDM that is multiplexed with a plurality of carriers, a peak to average power ratio (PAPR) increases. When the PAPR increases, a power amplifier operates in a saturation area rather than a linear operation area, and thus a signal may be distorted. In order to prevent this, an excessive dynamic range should be set to a power amplifier, and this deteriorates efficiency of the power amplifier.

In order to solve the above problem, a constant envelope (CE) OFDM transmission method of a form in which an analog method (FM/PM) is coupled may be used. A CE-OFDM system has a characteristic that in a baseband, a PAPR is 0, and an amplitude of a transmitting signal is the same in a time axis.

In a CE-OFDM system, because a signal that is output after inverse discrete Fourier transform (IDFT) generally represents a Gaussian distribution of average 0, the signal is largely affected by noise.

SUMMARY OF THE INVENTION

The present invention has been made in an effort to provide a method and apparatus for transmitting/receiving a signal in an OFDM system having advantages of enhancing signal reception performance of a CE-OFDM system by adjusting a distribution of a signal that is output after inverse Fourier transform.

An exemplary embodiment of the present invention provides a method of transmitting a signal of an OFDM system. The method includes: modulating a source bit to a symbol signal; performing inverse Fourier transform of the symbol signal; converting a distribution of a signal in which inverse Fourier transform is performed; and transmitting the signal having a converted distribution.

The converting of a distribution of a signal may include converting a Gaussian distribution of the signal in which inverse Fourier transform is performed to a bimodal Gaussian distribution.

The converting of a distribution of a signal may further include limiting a phase of the signal in which inverse Fourier transform is performed to $-\pi$ to $\pi$.

The converting of a distribution of a signal may include performing a u-law expanding process of the signal in which inverse Fourier transform is performed.

The transmitting of the signal may include modulating and transmitting a phase of the signal having a converted distribution.

Another embodiment of the present invention provides an apparatus for transmitting a signal of an OFDM system. The apparatus includes: a mapper that modulates a source bit to a symbol signal; an inverse Fourier transformer that performs inverse Fourier transform of the symbol signal; a signal distribution converter that converts a distribution of the signal in which inverse Fourier transform is performed; and a transmitter that transmits the signal having a converted distribution.

The inverse Fourier transformer may convert a Gaussian distribution of the signal in which inverse Fourier transform is performed to a bimodal Gaussian distribution.

The inverse Fourier transformer may limit a phase of the signal in which inverse Fourier transform is performed to $-\pi$ to $\pi$.

The inverse Fourier transformer may perform a u-law expanding process of the signal in which inverse Fourier transform is performed.

The transmitter may include a phase modulator that modulates and transmits a phase of the signal having a converted distribution.

Yet another embodiment of the present invention provides a method of receiving a signal of an OFDM system. The method includes: estimating a phase value of a received signal; expanding the received signal using the estimated phase value; and performing a Fourier operation of the expanded signal and demodulating the signal in which a Fourier operation is performed.

The expanding of the received signal may include performing a u-law expanding process of the received signal.

DETAILED DESCRIPTION OF THE EMBODIMENTS

Figure 1:
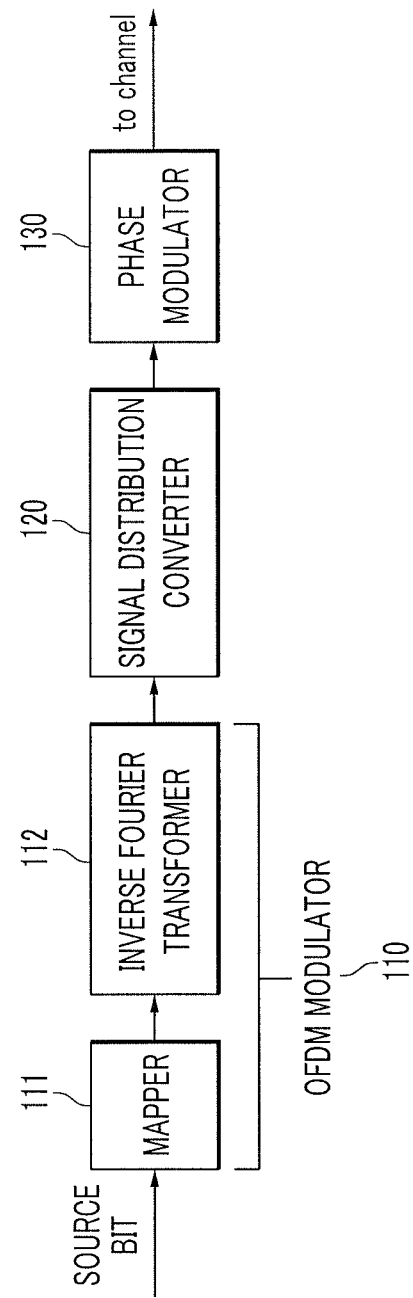
FIG. 1 is a block diagram illustrating a CE-OFDM transmitter according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements. In addition, the terms "-er", "-or", "module", and "block" described in the specification mean units for processing at least one function and operation, and can be implemented by hardware components or software components and combinations thereof.

FIG. 1 is a block diagram illustrating a CE-OFDM transmitter according to an exemplary embodiment of the present invention.

Referring to FIG. 1, the CE-OFDM transmitter includes an OFDM modulator 110, a signal distribution converter 120, and a phase modulator 130. According to an exemplary embodiment of the present invention, the OFDM modulator 110 includes a mapper 111 and an inverse Fourier transformer 112.

First, source bits that are input to the OFDM modulator 110 are converted to a symbol signal in the mapper 111 through a method of quadrature phase shift keying (QPSK), 16 quadrature amplitude modulation (16 QAM), or 64 quadrature amplitude modulation (64 QAM).

Figure 2:
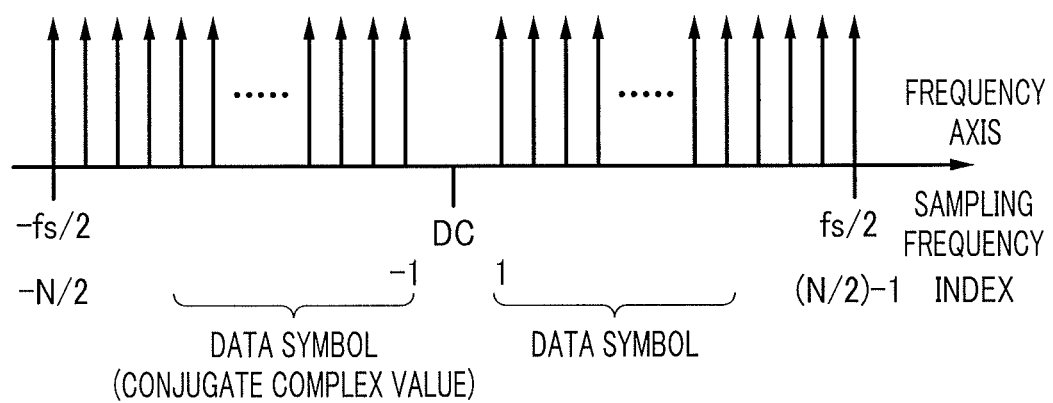
FIG. 2 is a graph illustrating a symbol signal that is arranged on a frequency axis.

FIG. 2 illustrates source bits that are converted to a symbol signal through a method of QPSK, 16 QAM, or 64 QAM in the mapper 111 and that are arranged on a frequency axis.

When it is necessary to input a real number signal to the phase modulator 130, the mapper 111 arranges a symbol signal on a frequency axis and inputs the symbol signal to the inverse Fourier transformer 112, as shown in FIG. 2.

Thereafter, symbol signals that are arranged on the frequency axis are inverse Fourier-transformed in the inverse Fourier transformer 112 to be a signal of a time domain, and are input to the signal distribution converter 120.

Hereinafter, the signal distribution converter 120 that converts a magnitude distribution of a signal that is output from the OFDM modulator 110 will be described with reference to FIGS. 3 to 6.

Figure 3:
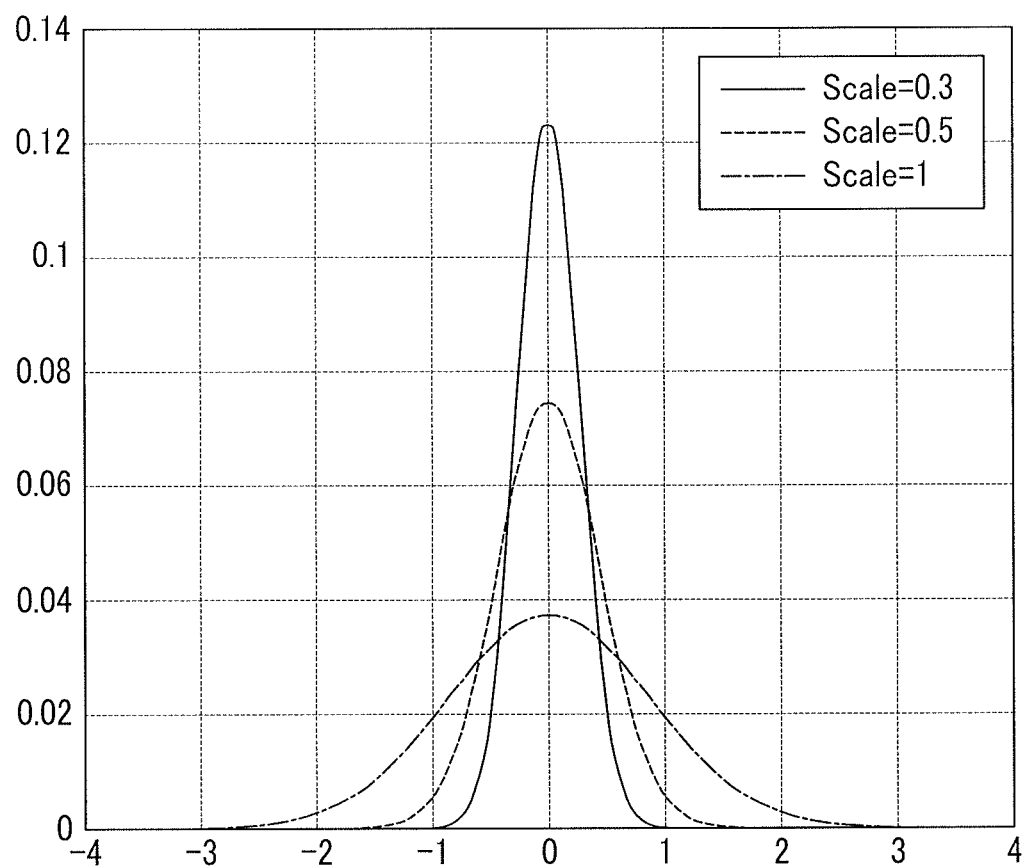
FIG. 3 is a graph illustrating a magnitude distribution of an OFDM modulated signal in a general CE-OFDM transmitter.

FIG. 3 is a graph illustrating a magnitude distribution of an OFDM modulated signal in a general CE-OFDM transmitter The graph of FIG. 3 represents a distribution according to each scale (=0.3, 0.5, and 1), and each graph follows a general Gaussian distribution having a greatest distribution at average 0.

$$f_S(x) = \frac{1}{\sqrt{2\pi}\sigma_x} e^{\frac{x^2}{2\sigma_x^2}} \quad \text{(Equation 1)}$$

That is, a magnitude of a signal that is output from the inverse Fourier transformer 112 is distributed as shown in FIG. 3 according to Equation 1.

The signal distribution converter 120 according to an exemplary embodiment of the present invention converts a magnitude distribution of an OFDM modulated signal to a bimodal Gaussian distribution from a general Gaussian distribution, as shown in FIG. 3.

Hereinafter, a distribution conversion process in the signal distribution converter 120 according to an exemplary embodiment of the present invention will be described in detail. First, a signal that is output from the OFDM modulator 110 is represented by Equation 2.

$$x[n] = \sum_{k=0}^{N-1} X[k] \exp\left(j\frac{2\pi k n}{N}\right), \quad \text{(Equation 2)}$$

$$n = 0, 1, \ldots, N-1$$

In Equation 1, N is a fast Fourier transform (FFT) magnitude, and X[K] represents a symbol signal that is input to an inverse Fourier transform unit.

In a conventional CE-OFDM system, by multiplying a scaling factor of an appropriate magnitude to an output signal, reception performance was obtained as shown in FIG. 3. FIG. 3 represents a distribution of an output signal in which 0.3, 0.5, and 1 as scaling factors are multiplied by an output signal x[n] of a conventional OFDM modulator.

Alternatively, in the present invention, by changing a distribution pattern of x[n] from general Gaussian to bimodal Gaussian through the signal distribution converter 120, reception performance can be improved.

According to an exemplary embodiment of the present invention, the signal distribution converter 120 changes a distribution of an output signal of the OFDM modulator 110 using an improved u-law expanding method. The improved u-law expanding method may be embodied through Equation 3. In Equation 3, x[n] that is output from the OFDM modulator 110 is converted to $x\text{-}_{suggested\_c}[n]$ in the signal distribution converter 120.

$$x_{proposed\_c}[n] = \frac{B \cdot \text{Sgn}(x[n]) \cdot \ln\left(1 + u\left|\frac{x[n]}{A}\right|\right)}{\ln(1+u)} \quad \text{(Equation 3)}$$

In Equation 3, Sgn <•> represents an encoding function, u is a variable that determines a magnitude of distortion, and B represents a variable that limits a maximum value and a minimum value of a signal. A is defined by Equation 4.

$$A = \max(|x[n]|), n=0, 1, \ldots, N-1 \quad \text{(Equation 4)}$$

A distribution of an output signal of the OFDM modulator 110 that is input to the signal distribution converter 120 may be converted to a bimodal Gaussian distribution through operation of Equation 3. That is, in order to reduce sensitivity by noise, an output signal of an IDFT portion that is distributed at a periphery of n=0 may be distributed to both sides of 0.

In this case, when a phase of a signal that is output from the OFDM modulator 110 deviates in a range of −π (3.141592 . . . ) to π, a receiving terminal may demodulate a received signal to an erroneous phase. In an exemplary embodiment of the present invention, in order to prevent this, in Equation 3, by adjusting a magnitude of B, a phase of a signal that is output from the OFDM modulator 110 is limited to a range of $-\pi$ to $\pi$ and thus a phase demodulation error can be reduced.

Figure 4:
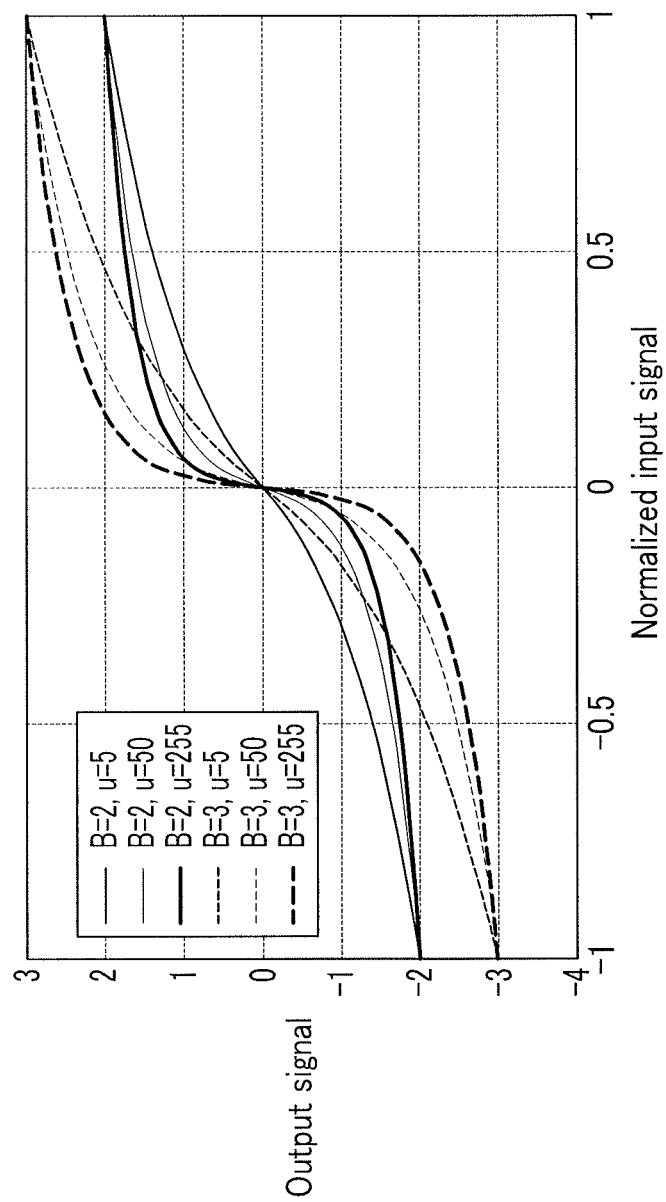
FIG. 4 is a graph illustrating input/output characteristics of a signal distribution conversion method according to an exemplary embodiment of the present invention.
Figure 5:
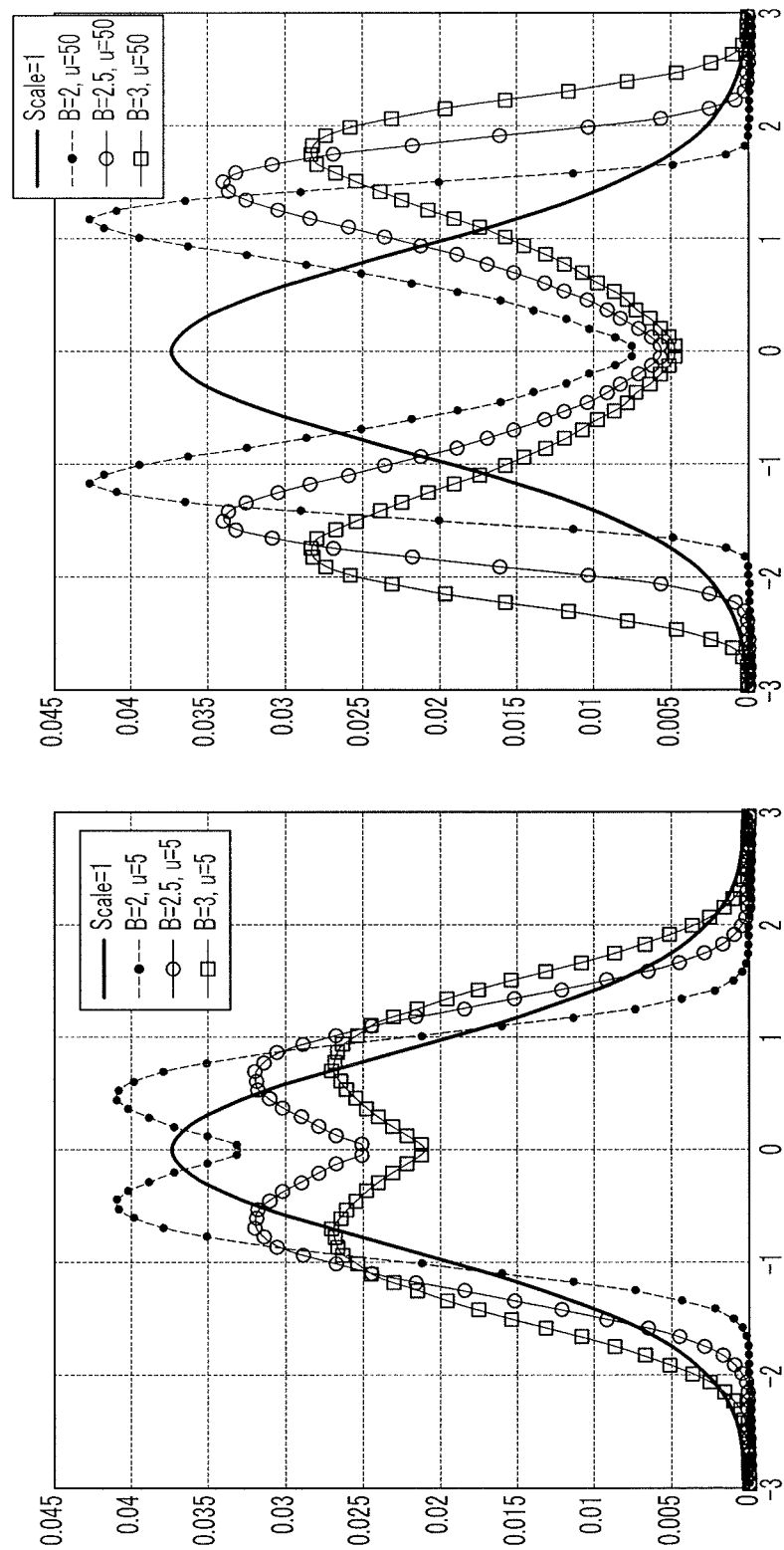
FIG. 5 is a graph illustrating a distributed signal distribution according to an exemplary embodiment of the present invention.
Figure 6:
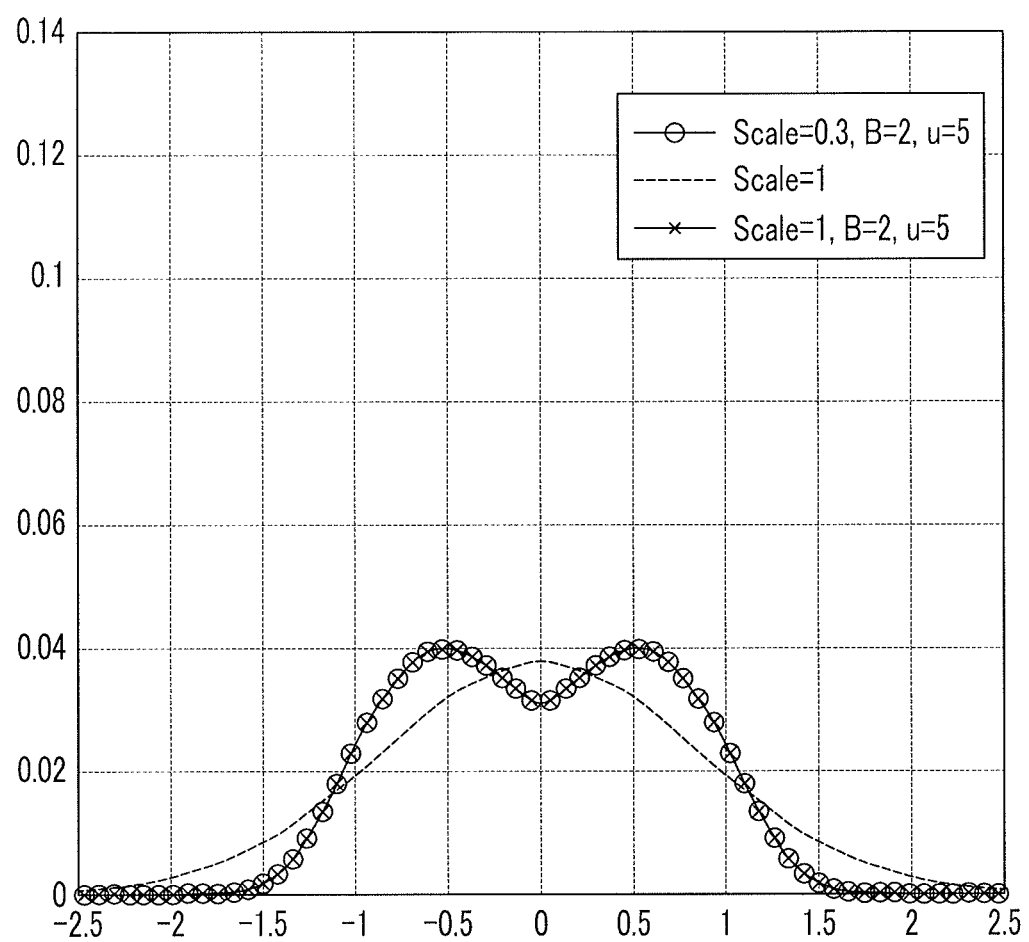
FIG. 6 is a graph illustrating a relationship of a scaling factor and a distributed signal distribution according to an exemplary embodiment of the present invention.

FIG. 4 is a graph illustrating input/output characteristics of a signal distribution conversion method according to an exemplary embodiment of the present invention, FIG. 5 is a graph illustrating a distributed signal distribution according to an exemplary embodiment of the present invention, and FIG. 6 is a graph illustrating a relationship of a scaling factor and a distributed signal distribution according to an exemplary embodiment of the present invention.

Referring to FIG. 4, when a range of an input signal magnitude is −1 to 1, if a value B is 2, a magnitude of an output signal became −2 to 2, and when the value B is 3, a magnitude of an output signal became −3 to 3.

When a value u is the minimum 5, distortion was less performed, and each graph was represented in an almost linear shape, and when value u is the maximum 255, distortion was largely performed and thus each graph was represented similar to a step function type. That is, it can be seen that as the value u increases, a bimodal gap increases.

Two graphs that are shown in FIG. 5 compare a distribution change of a signal magnitude that is output from the OFDM modulator 110 according to the value u. It can be seen that in a right graph of FIG. 5 in which the value u is 50, signal magnitudes are less distributed and bimodal characteristics are remarkable at a location in which a magnitude of an output signal is about 0, compared with a left graph of FIG. 5 in which the value u is 5.

Further, referring to each graph of FIG. 5, it can be seen that as a value B increases, a bimodal gap increases.

A general Gaussian distribution graph that is represented by a solid line in FIG. 5 is a control group for emphasizing bimodal distribution characteristics of the remaining graphs. When comparing a solid line graph and the remaining graphs, in a distribution of a signal that is output from the OFDM modulator 110, it can be seen that a distribution density of a periphery of 0 decreases through the signal distribution converter 120 of the present invention, and a bimodal distribution of both sides of 0 is changed to increase.

Referring to FIG. 6, even if a value of an output signal of the OFDM modulator 110 that is input to the signal distribution converter 120 is scaled to another magnitude, it can be seen that bimodal distribution characteristics thereof are not changed.

In a conventional CE-OFDM system, because a magnitude of a signal that is output from the OFDM modulator 110 was changed according to a magnitude of FFT and the amount of data, in order to improve reception performance of a signal, a scaling factor of an appropriate magnitude was multiplied by an output signal.

Referring to FIG. 6, in an exemplary embodiment of the present invention, because a distribution of an output signal can be converted regardless of a scaling factor, improvement of reception performance of an output signal can be expected regardless of a magnitude of FFT and the amount of data.

Thereafter, $x_{suggested\_c}[n]$ that is output from the signal distribution converter 120 is modulated to s[n] through the phase modulator 130.

$$s[n]=\exp(j \cdot x_{proposed\_c}[n]) \quad \text{(Equation 5)}$$

Thereafter, a signal s[n] in which a phase is modulated in the phase modulator 130 is transmitted through a channel. In an exemplary embodiment of the present invention, a channel in which a signal s[n] is transmitted is regarded as an additive white Gaussian noise (AWGN) channel.

Figure 7:
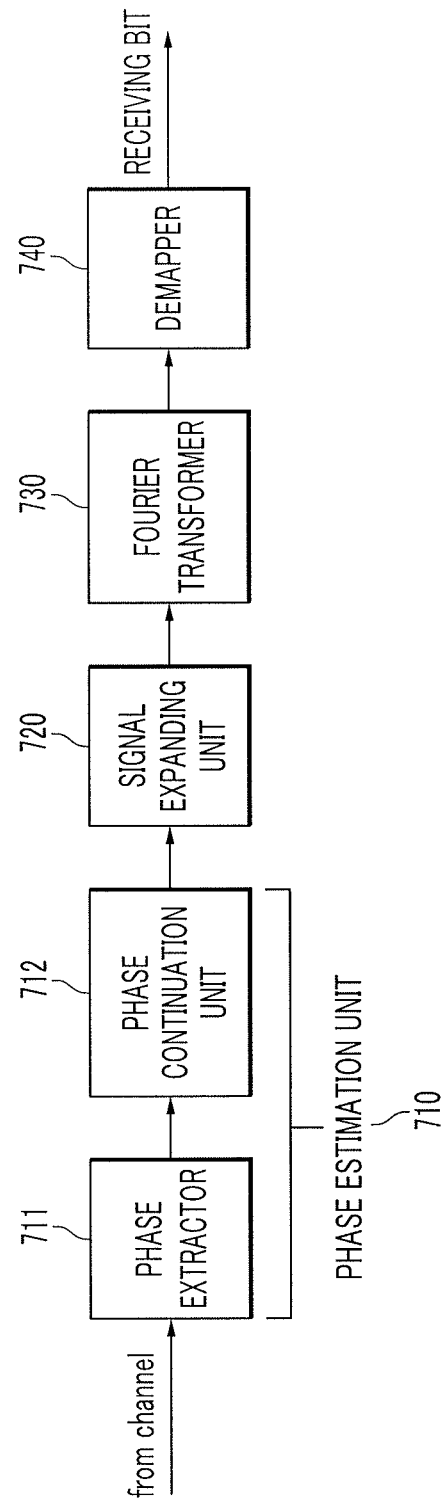
FIG. 7 is a block diagram illustrating a CE-OFDM receiver according to an exemplary embodiment of the present invention.

FIG. 7 is a block diagram illustrating a CE-OFDM receiver according to an exemplary embodiment of the present invention.

Referring to FIG. 7, a CE-OFDM receiver according to an exemplary embodiment of the present invention includes a phase estimation unit 710, a signal expanding unit 720, a Fourier transformer 730, and a demapper 740. The phase estimation unit 710 includes a phase extractor 711 and a phase continuation unit 712.

A signal y[n] that is received through an AWGN channel is represented by Equation 6.

$$y[n]=s[n]+w[n] \quad \text{(Equation 6)}$$

That is, the received signal y[n] is regarded in a form in which an AWGN signal w[n] is added to a signal s[n] of Equation 5.

Next, the CE-OFDM receiver receives a signal y[n], extracts a phase value of a received signal from the phase extractor 711, and enables a phase that is discontinuously extracted from the phase continuation unit 712 to be continued. That is, a phase value ($\hat{x}_{proposed\_c}[n]$) is estimated through the phase estimation unit 710.

In this case, unlike a conventional CE-OFDM receiver, in an exemplary embodiment of the present invention, because a converted signal distribution is unrelated to a scaling factor, a CE-OFDM receiver according to an exemplary embodiment of the present invention does not scale a received signal again.

Thereafter, the signal expanding unit 720 of the CE-OFDM receiver expands a received signal using an estimated phase value. In this case, the signal expanding unit 720 expands a signal through operation like Equation 7.

$$\hat{x}[n] = \frac{A \cdot \exp\left\{\frac{\hat{x}_{proposed\_c}[n]}{B \cdot \text{Sgn}(\hat{x}_{proposed\_c}[n])} \cdot \ln(1+u)\right\} - A}{\text{Sgn}(\hat{x}_{proposed\_c}[n]) \cdot u} \quad \text{(Equation 7)}$$

In this case, Equation 7 may be represented as an inverse function of Equation 3.

Thereafter, the extended signal $\hat{x}[n]$ is converted to a signal of a frequency domain in the Fourier transformer 730 and is demodulated through the demapper 740 to be restored to original data.

Figure 8:
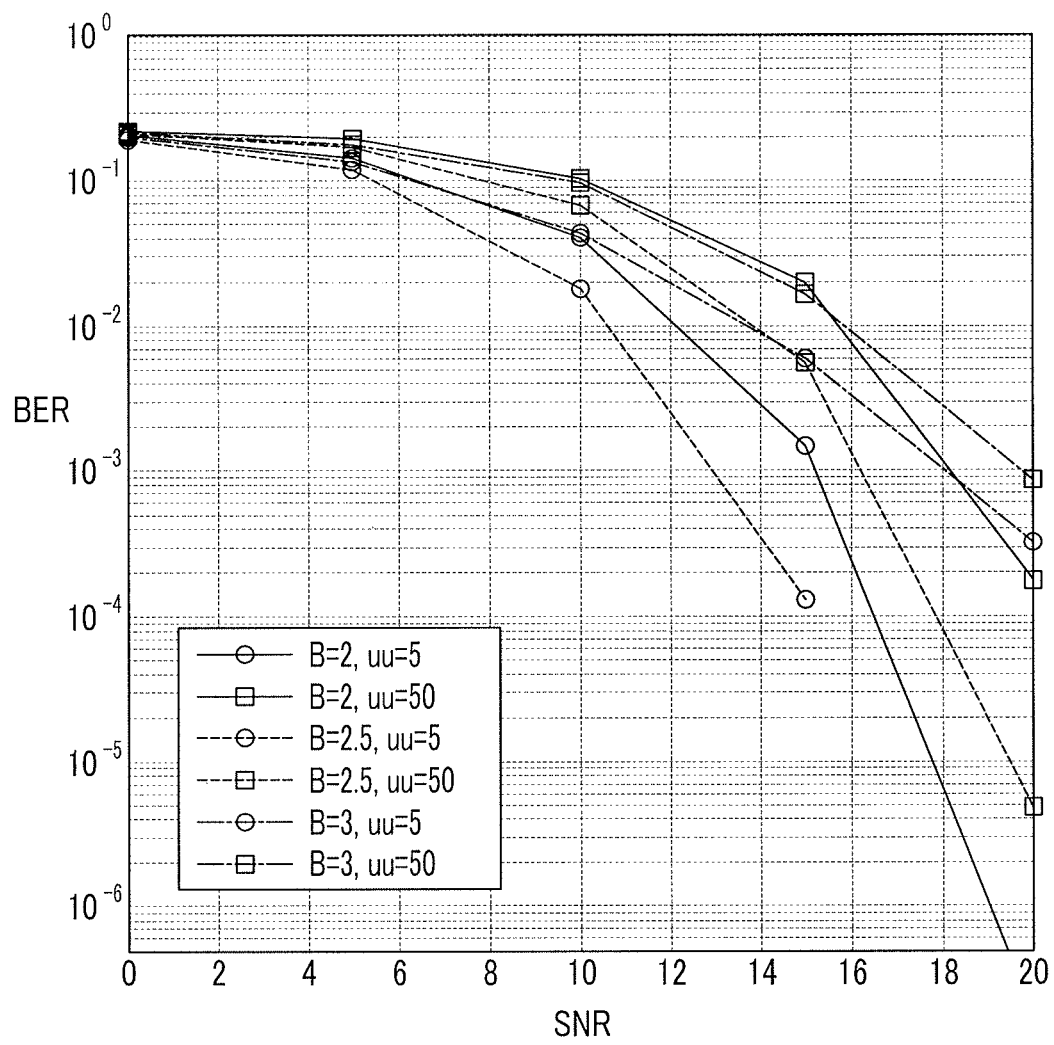
FIG. 8 is a graph illustrating signal reception performance according to a value B and a value u according to an exemplary embodiment of the present invention.
Figure 9:
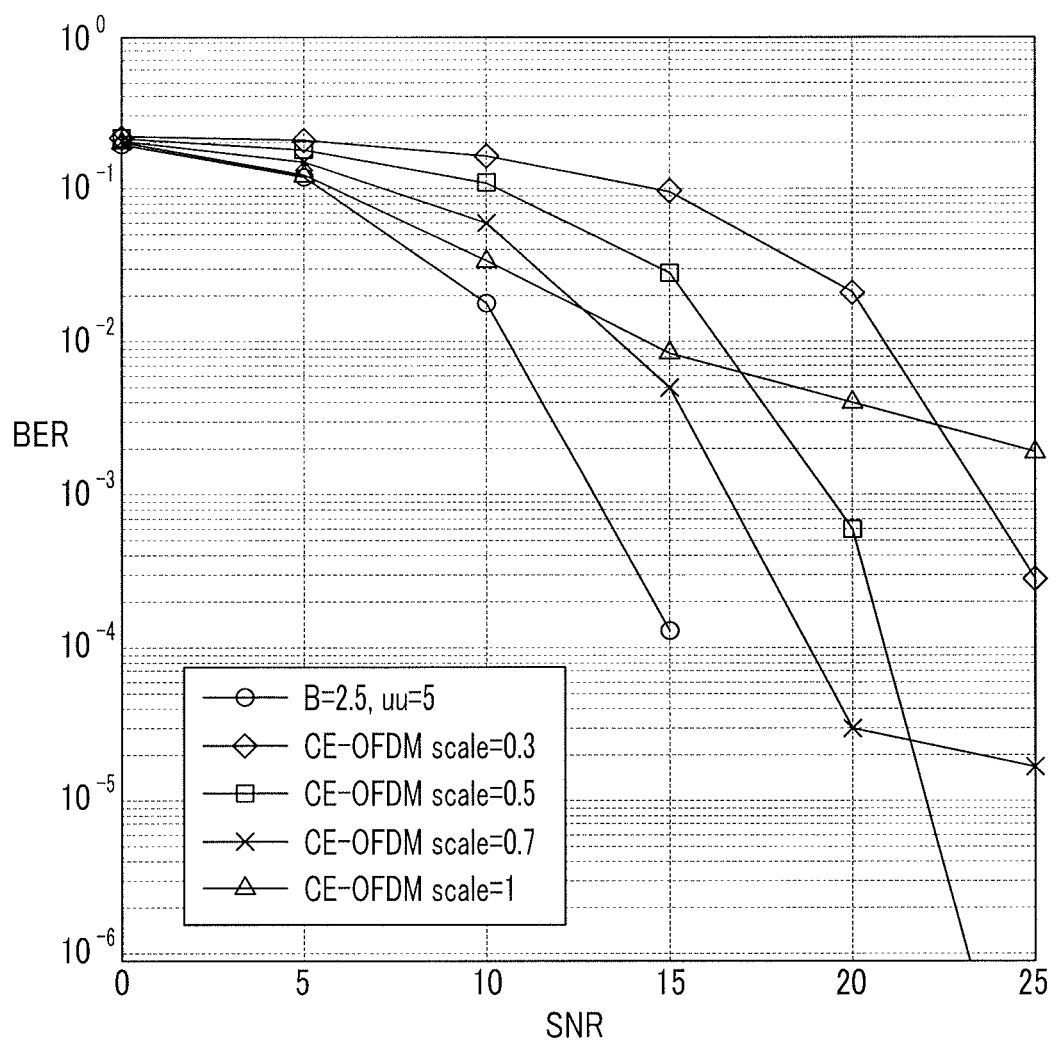
FIG. 9 is a graph illustrating signal reception performance that is converted to a bimodal distribution according to an exemplary embodiment of the present invention.

FIG. 8 is a graph illustrating signal reception performance according to a value B and a value u according to an exemplary embodiment of the present invention, and FIG. 9 is a graph illustrating signal reception performance that is converted to a bimodal distribution according to an exemplary embodiment of the present invention.

FIGS. 8 and 9 are graphs illustrating a simulated bit error rate (BER) when a signal that is modulated to a magnitude N 512 of FFT, the data number 384, and a method of 16 QAM is received through an AWGN channel.

Referring to FIG. 8, it can be seen that a signal having a small value u shows better performance than a signal having a large value u at the same value B. The best performance was represented when a value B is 2.5 at the same value u.

Referring to FIG. 9, it can be seen that a graph according to an exemplary embodiment of the present invention that is displayed with a solid line shows superbly good performance, compared with the remaining graphs in which an output signal of the OFDM modulator 110 is simply scaled.

In this way, according to an exemplary embodiment of the present invention, by changing a magnitude distribution of a signal that is output from the OFDM modulator to a bimodal Gaussian distribution, an influence by noise in a receiving terminal can be reduced. Further, by limiting a signal that is output from the OFDM modulator to an appropriate magnitude, a phase in the receiving terminal can be prevented from being incorrectly demodulated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting a signal of an orthogonal frequency division multiplexing (OFDM) system, the method comprising:
    modulating a source bit to a symbol signal;
    performing inverse Fourier transform of the symbol signal;
    converting a distribution of the signal in which inverse Fourier transform is performed; and
    transmitting the signal having a converted distribution,
    wherein the distribution of the signal includes a conversion of an output x[n] from an OFDM modulator to a bimodal distribution ($X_{proposed}$ c[n]) according to expansion equation $$x_{proposed\_c}[n] = \frac{B \cdot \text{Sgn}(x[n]) \cdot \ln\left(1 + u\left|\frac{x[n]}{A}\right|\right)}{\ln(1 + u)},$$

wherein Sgn(x[n]) is an encoding function, u is a variable corresponding to a magnitude of distortion, B is a variable limiting a maximum and a minimum value of the transmitted signal, and A=
    $A = \max(|x[n]|), n=0, 1, \ldots, N-1$.

2. The method of claim 1, wherein the converting of a distribution of the signal further comprises limiting a phase of the signal in which inverse Fourier transform is performed to $-\pi$ to $\pi$.

3. The method of claim 1, wherein the transmitting of the signal comprises:
    modulating a phase of the signal having a converted distribution; and
    transmitting the phase modulated signal.

4. An apparatus for transmitting a signal of an OFDM system, the apparatus comprising:
    a mapper that modulates a source bit to a symbol signal;
    an inverse Fourier transformer that performs inverse Fourier transform of the symbol signal;
    a signal distribution converter that converts a distribution of the signal in which inverse Fourier transform is performed; and
    a transmitter that transmits the signal having a converted distribution,
    wherein the distribution of the signal includes a conversion of an output x[n] from an OFDM modulator to a bimodal distribution ($x_{proposed}$ c[n]) according to expansion equation $$x_{proposed\_c}[n] = \frac{B \cdot \text{Sgn}(x[n]) \cdot \ln\left(1 + u\left|\frac{x[n]}{A}\right|\right)}{\ln(1 + u)},$$

wherein Sgn(x[n]) is an encoding function, u is a variable corresponding to a magnitude of distortion, B is a variable limiting a maximum and a minimum value of the transmitted signal, and A=
    $A = \max(|x[n]|), n=0, 1, \ldots, N-1$.

5. The apparatus of claim 4, wherein the inverse Fourier transformer limits a phase of the signal in which inverse Fourier transform is performed to a range of $-\pi$ to $\pi$.

6. The apparatus of claim 4, wherein the transmitter comprises a phase modulator that modulates a phase of the signal having a converted distribution and transmits the phase modulated signal.

7. A method of receiving a signal of an OFDM system, the method comprising:
    estimating a phase value of a received signal;
    expanding the received signal using the estimated phase value; and
    performing a Fourier operation of the expanded signal and demodulating the signal in which a Fourier operation is performed,
    wherein the received signal is expanded according to an inverse function of $$x_{proposed\_c}[n] = \frac{B \cdot \text{Sgn}(x[n]) \cdot \ln\left(1 + u\left|\frac{x[n]}{A}\right|\right)}{\ln(1 + u)},$$

wherein $x_{proposed}$ c[n] is a bimodal distribution of the received signal, Sgn(x[n]) is an encoding function, u is a variable corresponding to a magnitude of distortion, B is a variable limiting a maximum and a minimum value of the received signal, and A=
    $A = \max(|x[n]|), n=0, 1, \ldots, N-1$.

* * * * *